Nov. 15, 1966 S. J. KENT 3,285,176
PRESSURE TIGHT IGNITER FITTING
Filed May 27, 1964
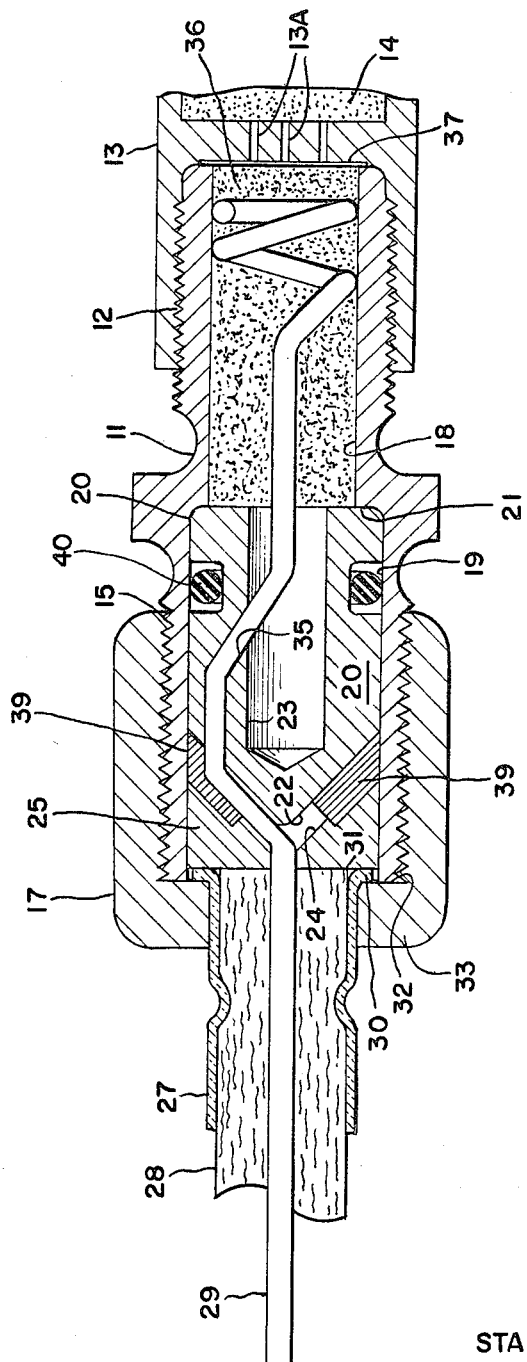
INVENTOR.
STANLEY J. KENT
BY: Harry M. Saragovitz,
Edward J. Kelly,
Herbert Berl &
S. Dubroff  ATTORNEYS.

United States Patent Office 3,285,176
Patented Nov. 15, 1966

3,285,176
PRESSURE TIGHT IGNITER FITTING
Stanley J. Kent, Philadelphia, Pa., assignor to the United States of America as represented by the Secretary of the Army
Filed May 27, 1964, Ser. No. 370,744
3 Claims. (Cl. 102—70)

The invention described herein may be manufactured and used by or for the Government for governmental purposes without the payment to me of any royalty thereon.

This invention relates to igniters and, more particularly to an improved igniter fitting for propellant actuated devices.

In the initiating of propellant actuated devices a significant requirement is the provision of a satisfactory detonating pressure.

One of the objects of the invention is to provide a gas pressure proof connection for the application of a mild detonating fuze to initiate propellant actuated devices.

In one aspect of the invention an igniter fitting is provided comprising a body member, one end of which is securable to a propellant means with the other end carrying releasable retaining means, the one end containing means for generating gas pressure within tthe body and the other end containing means for cooperating with the retaining means to secure thereto means for initiating the gas generating means, and self-sealing piston means intermediate the cooperating means and gas generating means.

Other objects, features and advantages may become apparent from the following description and accompanying drawing in which:

The figure is a longitudinal section view of an igniter embodying the principles of the invention.

Preferably, the igniter body or fitting 11 has one end 12 externally threaded for securement to a propellant actuated device 13 carrying a propellant charge 14 adapted to be detonated at a predetermined pressure. The other end 15 of the fitting is also externally threaded for threadedly receiving the mating internal threads of retaining nut 17. Communicatively intersecting forward and rearward chambers 18, 19 are provided in the respective one and other ends of the fitting, with the rearward chamber preferably formed as the larger of two concentric cylindrical passages and slidingly receiving piston element 20 which has its forward movement limited by the stop or flange 21 defined by the intersecting chambers 18, 19.

The piston 20 has a hollow interior defined by an open-ended chamber 23 and is closed at its rearward end by the symmetrically oriented conical surface 22 which is positioned adjacent a mating conical forward surface 24 of a centrally apertured plug element 25.

The suitably attached tubular brass or metallic coating element 27 of a mild detonating fuze 28 is provided with outwardly bent forward retaining flange means 30 which upon assembly of the fitting are interposed between the rearward substantially planar surface 31 of plug 25 and an adjacent forward face 32 of annular internal nut shoulder 33.

The piston is provided with an offset passage 35 communicatively connecting the conical rear surface 22 of the piston with its internal chamber 23. The central core 29 of the fuze 28 has its forward portion sufficiently exposed to be threaded or inserted through the apertured plug 25, piston passages 35 and 23, and into fitting chamber 18 where it is preferably embedded in an igniter charge of black powder 36 retained within the chamber 18 by an appropriate screen or equivalent member 37.

The conical plug surface 24 is suitably recessed for seating a portion of conically or dish-shaped, flexible, hermetically-sealing, neoprene gasket 39 that is adapted to sealingly cover piston passage 35.

When the retaining nut 17 is advanced to its ultimate along the fitting threaded portion 15, its flange 32 clampingly secures flange 30, plug 25, gasket 39, and piston 20 in their forwardmost assembled or conditioned position against stop 21, with an O-ring or equivalent seal 40 compressively seated in its groove provided in the piston forward peripheral surface to prevent fluid leakage therepast. With the igniter properly secured to the breech end of a closed ballistic system the mild detonating fuze 28 may be ignited causing the core 29 to burn until its forward portion ignites the black powder charge 36. The gas pressure generated thereby will tend to move the piston rearward and thus gasket 39 will positively seal offset passage 35 creating a pressure leak-proof container in which the predetermined sufficiently high gas pressure can be developed in order to set off the main propellant charge 14 through one or more vent passages 13A provided in the rear of device 13.

Various modifications, changes or alterations may be resorted to in practicing the invention without departing from the scope thereof as defined by the appended claims.

I claim:
1. An igniter fitting for propellant actuated devices and the like, comprising
    a body member having one end securable to a propellant means and its other end carrying releasable retaining means,
    means within said one end for generating gas pressure within said body member,
    means within said other end for cooperating with said retaining means to secure thereto a fuze core for initiating said gas generating means,
    self-sealing piston means intermediate said cooperating means and gas generating means,
    said core extending through said piston and into said gas generating means, and
    flexible seal means positioned at the entrance of said core into said piston with said flexible seal normally under partial compression and with said core having a portion embedded between said piston and a portion of said partially compressed seal,
    so constructed and arranged that upon burning of said core embedded portion said flexible seal portion will assume its normally partially compressed condition and seal said piston core entrance and that gas pressure will be entrapped within said body member upon subsequent ignition of said gas generating means.

2. An igniter fitting for propellant actuated devices and the like, comprising
    a body member having one end portion externally threaded for connection to a propellant means and its other end portion threadedly carrying a retaining nut,
    a first chamber within said one end portion and containing an ignition charge,
    a second chamber in said other end portion communicating with said first chamber,
    a piston in said second chamber and adapted to abut a stop means,
    a mild detonating fuze having retaining means located within said nut,
    a core extending from said fuze through said piston and into said charge,
    flexible seal means positioned at the entrance of said core into said piston with said flexible seal normally under partial compression and with said core having a portion embedded between said piston and a portion of said partially compressed seal, and a plug intermediate said retaining means and seal means, so constructed and arranged that threaded advancement of said nut upon said other portion will advance said plug to compress said seal means and force said piston against said stop means and thus condition the igniter such that upon ignition of said fuze, core and charge the generated gas pressure will tend to move said piston away from said stop means and toward said seal means.

3. An igniter fitting for propellant actuated devices and the like, comprising a body member having one end portion externally threaded for connection to a closed ballistic system and its other end portion threadedly carrying a retaining nut, a first chamber within said one end portion and containing an ignition charge, a second chamber in said other end portion communicating with said first chamber, a piston carrying an outer surface seal and slidable in second chamber and adapted to abut a stop means, a mild detonating fuze having retaining means located within said nut, a core extending from said fuze through said piston and into said charge, flexible seal means positioned at the entrance of said core into said piston with said flexible seal normally under partial compression and with said core having a portion embedded between said piston and a portion of said partially compressed seal, and a plug intermediate said retaining means and seal means, so constructed and arranged that threaded advancement of said nut upon said other portion will advance said plug to compress said seal means and force said piston against said stop means and thus condition the igniter such that upon ignition of said fuze, core and charge the generated gas pressure will tend to move said piston away from said stop means and toward said seal means.

References Cited by the Examiner

UNITED STATES PATENTS

| 102,250 | 4/1870 | Gomez | 102—26 |
|---|---|---|---|
| 1,400,554 | 12/1921 | Johnson | 102—86.5 |
| 2,296,504 | 9/1942 | Crater | 102—30 |
| 2,462,305 | 2/1949 | Catlin | 102—70 |
| 2,908,222 | 10/1959 | Blanchard et al. | 102—70 |
| 3,095,815 | 7/1963 | Brockway et al. | 102—70 |

FOREIGN PATENTS 524,860    8/1940    Great Britain.

BENJAMIN A. BORCHELT, *Primary Examiner.*

G. H. GLANZMAN, *Assistant Examiner.*